United States Patent
Fisher et al.

(10) Patent No.: US 9,951,459 B2
(45) Date of Patent: Apr. 24, 2018

(54) SYSTEMS AND METHODS FOR MONITORING SANITATION AGENTS IN A LAUNDRY SYSTEM

(71) Applicants: TCD PARTS, INC., Edgerton, MO (US); BRIGHTWELL DISPENSERS LTD, New Haven, East Sussex (GB)

(72) Inventors: Mark B. Fisher, Edgerton, MO (US); Joel Gross, Gilbert, AZ (US)

(73) Assignees: TCD Parts, Inc., Edgerton, MO (US); Brightwell Dispensers Ltd, East Sussex (GB)

(*) Notice: Subject to any disclaimer, the term of this patent is extended or adjusted under 35 U.S.C. 154(b) by 0 days.

(21) Appl. No.: 15/601,293

(22) Filed: May 22, 2017

(65) Prior Publication Data

US 2017/0335503 A1 Nov. 23, 2017

Related U.S. Application Data

(60) Provisional application No. 62/340,334, filed on May 23, 2016.

(51) Int. Cl.
*G08B 29/00* (2006.01)
*D06F 39/00* (2006.01)
(Continued)

(52) U.S. Cl.
CPC .......... *D06F 39/003* (2013.01); *D06F 31/005* (2013.01); *G05B 19/0426* (2013.01);
(Continued)

(58) Field of Classification Search
CPC .................................................... D06F 39/003
(Continued)

(56) References Cited

U.S. PATENT DOCUMENTS 5,500,050 A 3/1996 Chan et al.
2003/0230488 A1* 12/2003 Lee .................. G01N 27/44743
204/453

(Continued)

FOREIGN PATENT DOCUMENTS

WO 2009056613 A2 5/2009

OTHER PUBLICATIONS

PCT Application No. PCT/US2017/033817, International Search Report and Written Opinion dated Aug. 14, 2017, 9 pages.

*Primary Examiner* — Santiago Garcia
(74) *Attorney, Agent, or Firm* — Lathrop Gage L.L.P.

(57) ABSTRACT

A system for monitoring sanitation agents in a laundry machine comprises a plurality of channels. Each channel has an input port, an output port, and a glass tube. Each input port and output port is adapted to be fluidly coupled to the laundry machine. The system includes a monitoring unit associated with each of the glass tubes. Each monitoring unit includes a bubble detector and a flow rate measurement unit. A beeper is configured to generate an indication of an alarm condition based on a determination made by any one of the monitoring units. The system has a display screen, a memory storing computer-readable instructions, and a controller communicatively coupled to each of the monitoring units. The controller is configured to execute the instructions to wirelessly communicate to a web page a volume of a sanitation agent that has passed through each of the glass tubes.

20 Claims, 10 Drawing Sheets

(51) Int. Cl.
*D06F 31/00* (2006.01)
*G05B 19/042* (2006.01)
*G08B 25/00* (2006.01)
*G08B 25/10* (2006.01)
*H04L 12/28* (2006.01)
*H04L 12/24* (2006.01)

(52) U.S. Cl.
CPC ......... *G08B 25/001* (2013.01); *G08B 25/008* (2013.01); *G08B 25/10* (2013.01); *H04L 12/2827* (2013.01); *H04L 41/0803* (2013.01)

(58) Field of Classification Search
USPC .......................................................... 340/506
See application file for complete search history.

(56) References Cited

U.S. PATENT DOCUMENTS

| | | | |
|---|---|---|---|
| 2008/0016626 A1* | 1/2008 | Oak | D06F 35/006 8/158 |
| 2008/0110479 A1 | 5/2008 | Veening et al. | |
| 2010/0000024 A1* | 1/2010 | Hendrickson | D06F 33/02 8/137 |
| 2010/0139010 A1* | 6/2010 | Lee | D06F 39/02 8/159 |
| 2010/0141460 A1* | 6/2010 | Tokhtuev | A61M 5/1684 340/621 |
| 2010/0212704 A1 | 8/2010 | Kan et al. | |
| 2011/0054843 A1* | 3/2011 | Han | H04L 12/2825 702/185 |
| 2012/0324995 A1* | 12/2012 | Tincher | G01F 23/243 73/304 C |
| 2014/0182068 A1* | 7/2014 | Balinski | D06F 33/02 8/137 |
| 2015/0204701 A1 | 7/2015 | Klicpera | |
| 2015/0351290 A1* | 12/2015 | Shedd | F25B 23/006 361/679.47 |
| 2016/0120058 A1* | 4/2016 | Shedd | F25B 23/006 165/244 |
| 2017/0037559 A1* | 2/2017 | Gallagher | D06F 39/022 |

* cited by examiner

SYSTEMS AND METHODS FOR MONITORING SANITATION AGENTS IN A LAUNDRY SYSTEM

CROSS-REFERENCE TO RELATED APPLICATIONS

This application claims priority to U.S. Provisional Patent Application Ser. No. 62/340,334, titled "Alarm Unit for Laundry Systems", filed May 23, 2016, the disclosure of which is incorporated herein by reference in its entirety.

FIELD OF THE DISCLOSURE

The disclosure relates generally to the field of monitoring devices for laundry systems. More specifically, the disclosure relates to monitoring devices for monitoring a flow rate and volume of sanitation agents dispensed in laundry systems.

SUMMARY

The following presents a simplified summary of the disclosure in order to provide a basic understanding of some aspects of the disclosure. This summary is not an extensive overview of the disclosure. It is not intended to identify critical elements of the disclosure or to delineate the scope of the disclosure. Its sole purpose is to present some concepts of the disclosure in a simplified form as a prelude to the more detailed description that is presented elsewhere.

In an embodiment, a system for monitoring sanitation agents in a laundry machine comprises a plurality of channels. Each channel has a cylindrical input port, a cylindrical output port, and a glass tube. Each input port and output port is adapted to be fluidly coupled to a sanitation agent supply vessel of the laundry machine. The system includes a monitoring unit associated with each of the glass tubes. Each monitoring unit includes a bubble detector and a flow rate measurement unit arranged in line with the bubble detector. The bubble detector includes an infrared LED and an infrared detector. The flow rate measurement unit includes a positive displacement sensor. The system has a plurality of visible indicators. Each one of the visible indicators is associated with one of the plurality of channels. The system comprises a memory storing computer-readable instructions and a plurality of thresholds. Each one of the thresholds is associated with one of the plurality of channels. The system has a controller communicatively coupled to each monitoring unit. The controller is configured to execute the instructions to: (a) determine an alarm condition; (b) cause at least one of the plurality of visible indicators to identify the channel with which the alarm condition is associated; and (c) wirelessly communicate to a web page a volume of a sanitation agent that has passed through each of the glass tubes.

In an aspect of the embodiment, the glass tubes and the monitoring units are housed within a case.

In an aspect of the embodiment, the plurality of channels include six channels.

In an aspect of the embodiment, the system includes a liquid crystal display.

In an aspect of the embodiment, the system has a beeper configured to generate an audible notification in response to the determination of the alarm condition.

In an aspect of the embodiment, the liquid crystal display and each of the visible indicators are disposed on a top side of said case.

In an aspect of the embodiment, the system comprises a mute button usable to silence the audible notification.

In an aspect of the embodiment, the system has a mute button usable to silence said audible notification for a predefined time period.

In an aspect of the embodiment, the instructions are further configured to communicate to the web page information about the determination of the alarm condition.

In an aspect of the embodiment, the information includes a time at which said alarm condition was determined.

According to another embodiment, a system for monitoring sanitation agents in a laundry machine comprises a case having a top side, an input side, and an output side opposing the input side. The input side has a plurality of input ports and the output side has a plurality of output ports. The system includes a plurality of glass tubes. Each of the plurality of glass tubes fluidly couples one of the plurality of input ports to one of the plurality of output ports. The system has a plurality of monitoring units. Each of the plurality of monitoring units is associated with one of the plurality of glass tubes. Each of the plurality of monitoring units includes a bubble detector and a flow rate measurement unit arranged in line with the bubble detector. The bubble detector includes an infrared LED and an infrared detector. The flow rate measurement unit includes a positive displacement sensor. A liquid crystal display is arranged on the case top side. The system has a memory storing computer-readable instructions. A controller is configured to execute the instructions to determine an alarm condition. A visible indicator is configured to identify one of the plurality of glass tubes with which the alarm condition is associated.

In an aspect of the embodiment, the system includes a beeper that is activated upon the determination of the alarm condition.

In an aspect of the embodiment, the system comprises a networking interface configured to communicate an indication of the alarm condition to a computing device.

In an aspect of the embodiment, the computing device is a mobile computer.

In an aspect of the embodiment, the controller is housed on a printed circuit board within said case.

In yet another embodiment, a system for monitoring sanitation agents in a laundry machine comprises a plurality of channels. Each channel has an input port, an output port, and a glass tube. Each input port and output port is adapted to be fluidly coupled to the laundry machine. The system includes a monitoring unit associated with each of the glass tubes. Each monitoring unit includes a bubble detector and a flow rate measurement unit. A beeper is configured to generate an indication of an alarm condition based on a determination made by any one of the monitoring units. The system has a display screen, a memory storing computer-readable instructions, and a controller communicatively coupled to each of the monitoring units. The controller is configured to execute the instructions to wirelessly communicate to a web page a volume of a sanitation agent that has passed through each of the glass tubes.

In an aspect of the embodiment, the system comprises a plastic case housing each of the glass tubes.

In an aspect of the embodiment, the system has mute button; said mute button useable to silence the beeper for a time period.

In an aspect of the embodiment, the system comprises one visible indicator associated with each of the plurality of channels.

In an aspect of the embodiment, the flow rate measurement unit includes a positive displacement sensor.

BRIEF DESCRIPTION OF THE SEVERAL VIEWS OF THE DRAWINGS

Illustrative embodiments of the present invention are described in detail below with reference to the attached drawing figures and wherein.

DETAILED DESCRIPTION

Embodiments of the present invention provide systems and methods for monitoring sanitation agents in laundry systems (e.g., front load washing machines, top load washing machines, high efficiency washing machines, etc.). Laundry systems provide a convenient and efficient alternative to washing dirty fabrics by hand, and are particularly ubiquitous in commercial settings (e.g., nursing homes, motels, hospitals, etc.), where a large number of dirty fabrics must be washed on a regular basis.

Generally speaking, a laundry system uses one or more sanitation agents during the wash cycle to ensure that the fabrics (e.g., bed sheets, comforters, towels, apparel, etc.) being laundered are appropriately cleaned. For example, a laundry system may run between four and six different sanitation agents at different times through the wash cycle. Some of the sanitation agents may have a relatively neutral pH, whereas others may be acidic or basic. For instance, when washing a dirty sheet, the laundry system may run both detergent, a basic substance, and parasitic acid, an acidic substance, through the wash cycle to ensure that the bacteria is eliminated and the sheet is ready for reuse.

The different sanitation agents being dispensed during the laundry cycle may have different flow rates. For example, depending on the type of fabric being cleaned, the laundry system may dispense both detergent and bleach at various points in the washing cycle, and the flow rate of the detergent may be greater than the flow rate of the bleach. The recommended flow rates of the different sanitation agents may be set by a manufacturer of the laundry system, and these flow rates may vary depending on the application (e.g., the flow rates of sanitation agents of laundry systems in hospitals may be different from the flow rates of sanitation agents of laundry systems in motels).

The laundry system may have associated therewith a supply vessel (e.g., a bucket, a box, a bottle, etc.) to retain each of the various sanitation agents. For example, a sanitation agent supply vessel associated with a laundry system may have a plurality of sections, each of which may retain one sanitation agent. Means may be provided in the laundry system to allow for the dispensation of the various sanitation agents, at the different recommended flow rates, throughout the laundry cycle. For instance, each supply vessel section may include a supply tube, and the laundry system may have control circuitry to cause the tube to dispense the appropriate amount of a sanitation agent during the wash cycle. If the appropriate amount of any one of the various sanitation agents is not dispensed during the wash cycle, the fabrics coming out of the wash may not be suitably cleaned. For example, if an acidic and a basic sanitation agent are intended to counteract each other during the wash cycle, but the appropriate amount of one of the sanitation agent is not dispensed, the resulting pH may be unsuitable and the fabrics coming out of the wash may not be useable. It is thus important that the appropriate amount of each of the various sanitation agents is dispensed during the wash cycle.

Situations may arise where the appropriate amount of one or more of the sanitation agents is not dispensed during the wash cycle. This may happen, for example, when a particular supply tube becomes congested over time, or, for example, when a supply vessel section does not have the appropriate amount of a sanitation agent for the supply tube to dispense. The fabrics coming out of the laundry system may therefore need to be rewashed, which may be undesirable. In some cases, an operator of the laundry system may be unable to determine that the fabrics have not been appropriately cleaned, and may end up using the fabrics, which also may cause much distress (e.g., occupants of beds having unsuitably clean sheets may develop bed sores or be plagued with other such conditions as a result).

Figure 1:
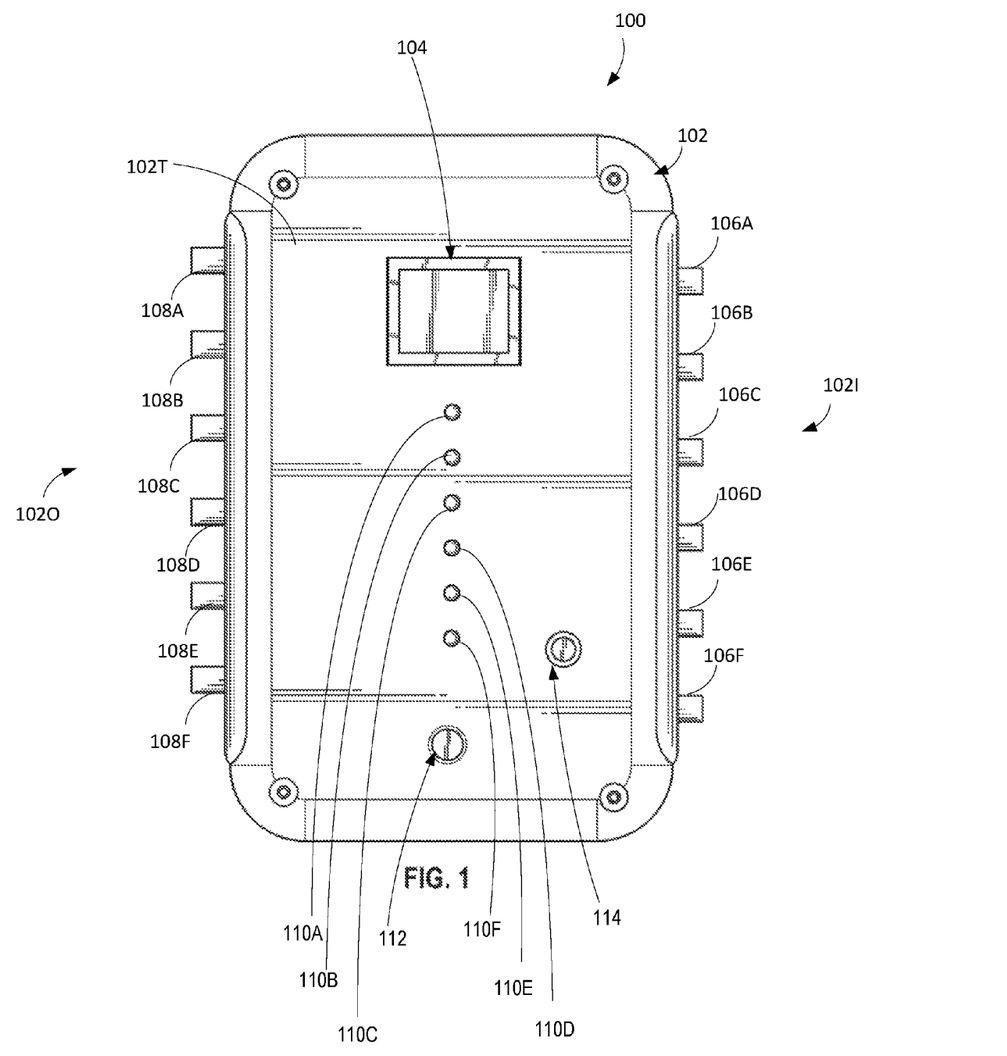
FIG. 1 is a top view of a system for monitoring various sanitation agents in a laundry system, in an embodiment.
Figure 2:
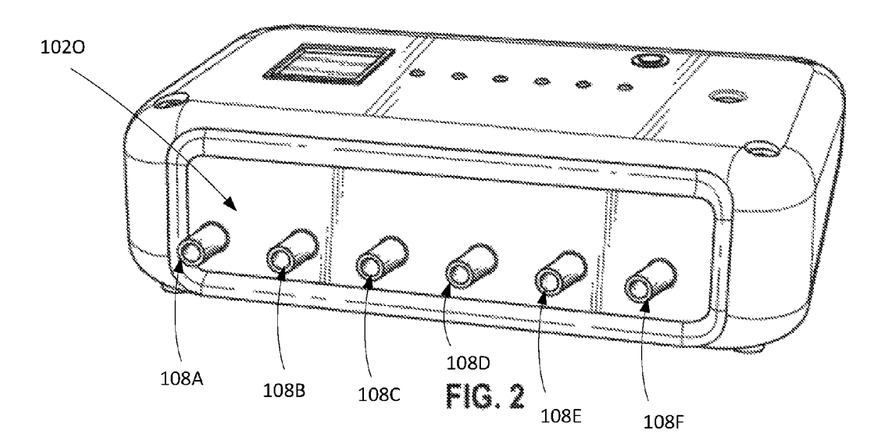
FIG. 2 is a side view of the monitoring system of FIG. 1 showing an output side thereof.
Figure 3:
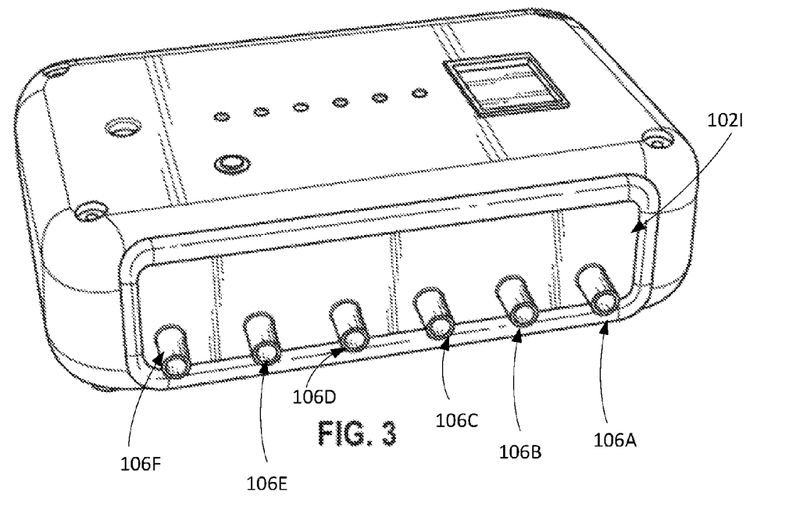
FIG. 3 is another side view of the monitoring system of FIG. 1 showing an input side thereof.

Attention is directed to FIGS. 1-3, which show a system 100 for monitoring the various sanitation agents in a laundry system. The system 100 may have a case 102, which may, in embodiments, be generally in the shape of a cuboid. The example case 102 has a top side 102T (FIG. 1), a bottom side opposing and extending generally parallel to said top side 102T, an input side 102I (FIG. 3) extending generally perpendicular to said top side 102T, and an output side 102O (FIG. 2) opposing said input side 102I. The case 102 may house various components (e.g., electronics, sensors, etc.) as discussed herein. The system 100, in embodiments, may be powered through conventional 110V/220V AC power. Alternately or additionally, the system 100 may be battery operated.

The system 100 may include a liquid crystal (or other) display 104, six (or a different number of) input connectors 106A-106F, one output connector 108A-108F corresponding to each input connector 106A-106F, a visible indicator (e.g., an LED light, such as LED lights 110A-110F) associated with each pair of input and output connectors, an audible alarm (e.g., a beeper) 112, and a button 114 that may be depressed to silence said alarm 112.

In an embodiment, the LCD 104, the visible indicators 110A-110F, the alarm 112, and the mute button 114 may each be viewable and/or accessible from the case top side 102T. The input connectors 106A-106F may extend outwardly from the case input side 102I and the output connectors 108A-108F may extend outwardly from the case output side 102O. The input connectors 106A-106F and/or the output connectors 108A-108F may, in embodiments, be generally cylindrical, and may, in some embodiments, be threaded. The size of one input connector (e.g., connector 106A) may be the same as the size of the corresponding output connector (e.g., 108A); in some embodiments, however, the size of one input connector (e.g., connector 106A) may be different from the size of another input connector (e.g., connector 106F). The case 102, including the input connectors 106A-106F and the output connectors 108A-108F may, in embodiments, be made of plastic or other desirable materials.

Figure 4:
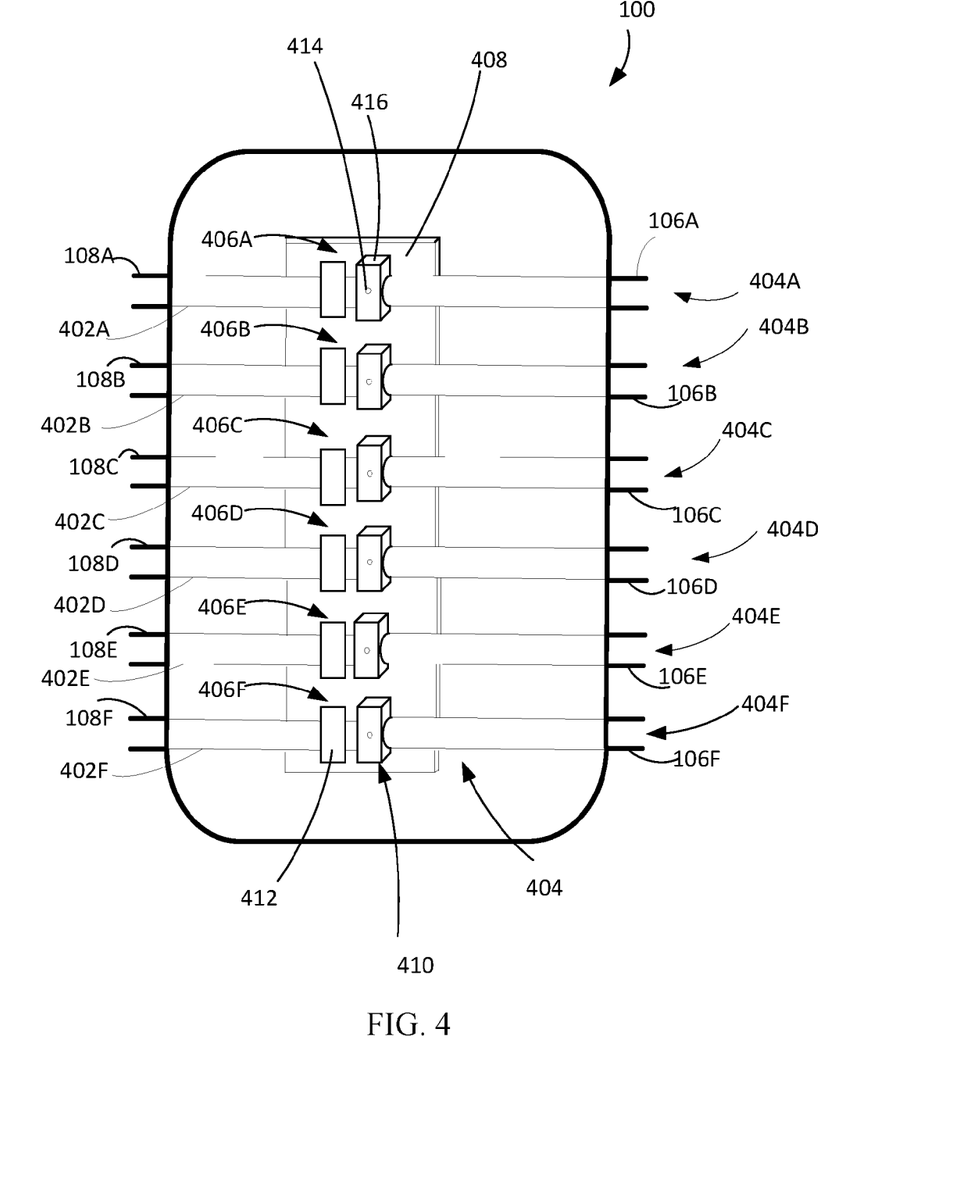
FIG. 4 schematically illustrates the contents of a case of the monitoring system of FIG. 1.

The case 102 may enclose a tube (e.g., a glass tube) 402A that fluidly couples the input connector 106A to the output connector 108A (see FIG. 4). The input connectors 106B-F may likewise be fluidly coupled to the output connectors 108B-F via glass tubes 402B-F, respectively. An input connector (e.g., input connector 106A), together with the corresponding output connector (e.g., output connector 108A) and the corresponding glass tube (e.g., tube 402A), may collectively be referred to herein as a channel 404. In the illustrated example embodiment, thus, the system 100 includes six channels 404A-F. While the figures show six channels 404A-404F, the artisan will appreciate that any number of channels may likewise be provided. The artisan will further appreciate from the disclosure herein that, depending on the application, one or more of the provided channels may not be employed (e.g., in embodiments, only five (or a different number) of the six channels may be fluidly coupled to the laundry machine as discussed herein).

Each channel 404A-F may have associated therewith a monitoring unit 406A-F, respectively. Each monitoring unit 406A-F may be communicatively coupled to one or more circuit boards (e.g., a single or dual layer printed circuit board) 408 housed within the case 102. Each monitoring unit 406A-406F, together with the printed circuit board 408 and programming instructions as detailed herein, may be configured to monitor the sanitation agent in the corresponding channel 404A-404F.

In an embodiment, each monitoring unit 406A-406F associated with a channel 404A-404F may include a bubble detector 410 and a flow rate measurement unit 412. Each monitoring unit 406A-406F may be adjacent (e.g., be proximate or in contact with) the glass tube 402A-402F of one of the channels 404A-404F. For example, the monitoring unit 406A may be associated with the glass tube 402A of the channel 404A. Each monitoring unit 406A-406F may include a bubble detector 410 and a flow rate measurement unit 412 placed in line therewith.

Each bubble detector 410 may include an infrared LED 414 and an infrared detector 416. Each flow rate measurement unit 412 may be or may comprise a flow rate sensor, such as a positive displacement sensor or other flow rate sensor. The bubble detector 410 and the flow rate measurement unit 412 associated with a channel (e.g., channel 404A) may allow for the monitoring of the sanitation agent in that channel. Specifically, as discussed herein, as the sanitation agent flows through a channel (e.g., channel 404A), each of the bubble detector 410 and the flow rate measurement unit 412 may interact (e.g., functionally, physically, or otherwise) with the sanitation agent to allow for the monitoring of the sanitation agent flowing through the corresponding glass tube (e.g., tube 402A).

Figure 5A:
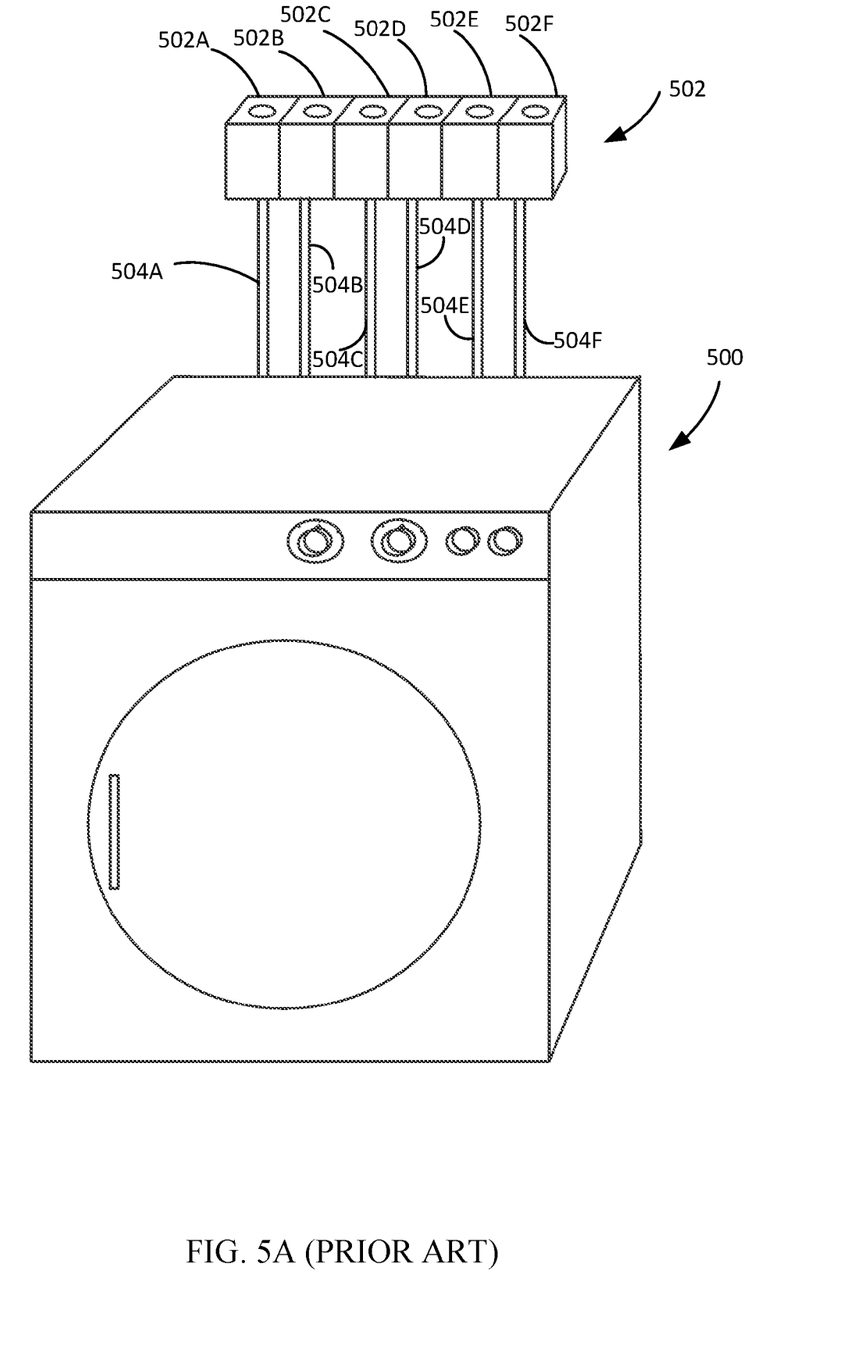
FIG. 5A shows a front view of a PRIOR ART laundry machine having a sanitation agent supply vessel.

FIG. 5A shows a prior art laundry machine 500. As is known, the laundry machine 500 may include a sanitation agent supply vessel 502 configured to retain sanitation agents that are selectively dispensed in the washing machine 500 during a wash cycle. In the illustrated example washing machine 500, the supply vessel 502 includes six sections 502A-502F, each of which have associated therewith one supply tube 504A-504F. Each supply tube 504A-504F is configured to selectively convey one of the six sanitation agents from the supply vessel 502 to the washing machine 500 during the wash cycle. The artisan will appreciate that the laundry machine 500, including the sanitation agent supply vessel 502 shown in FIG. 5A, is exemplary only and is not intended to be independently limiting. In some embodiments, the sanitation agent supply vessel 502 may be situated in the main housing of the laundry machine 500.

Figure 5B:
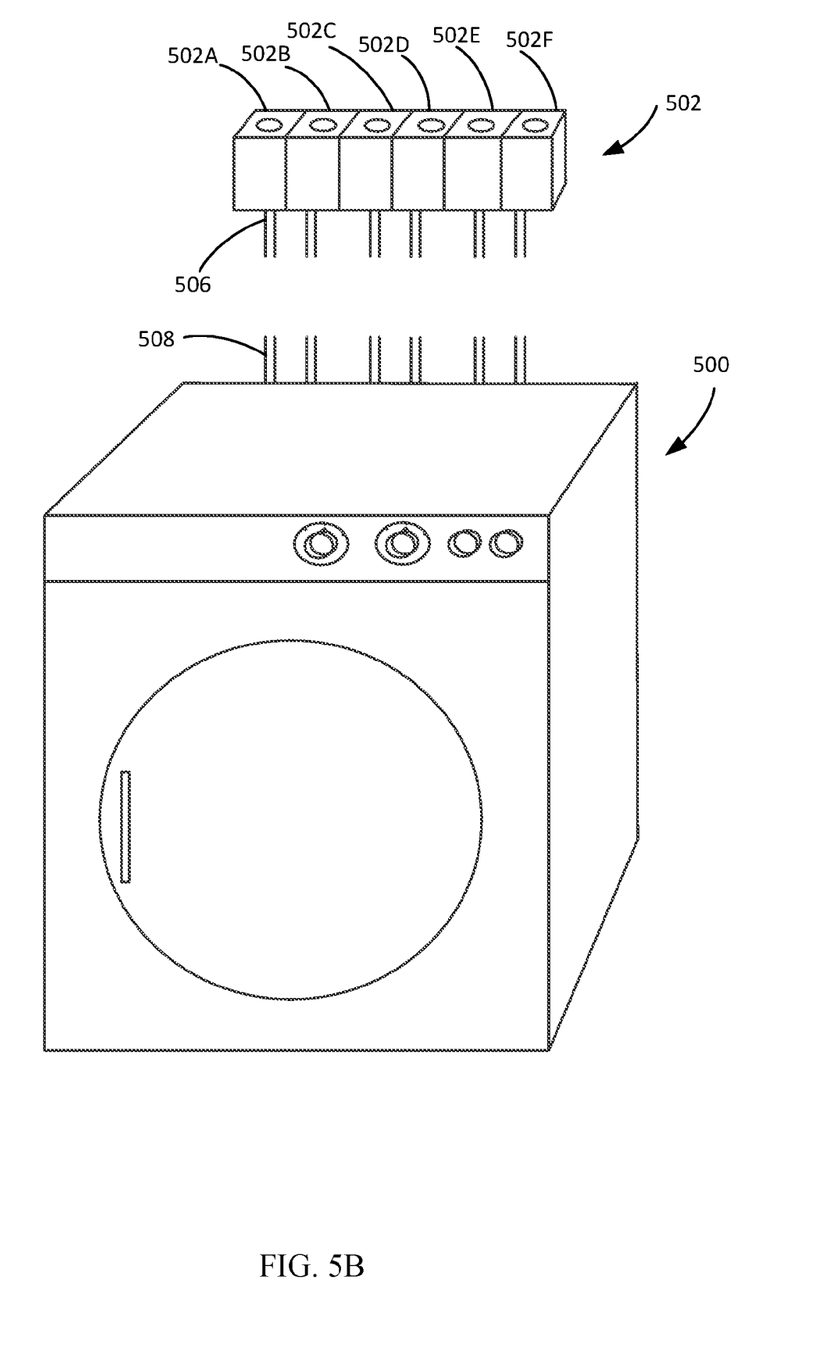
FIG. 5B shows supply tubes of the sanitation agent supply vessel of FIG. 5B being cut to allow for the fluid coupling of the monitoring system of FIG. 1 to the vessel.
Figure 5C:
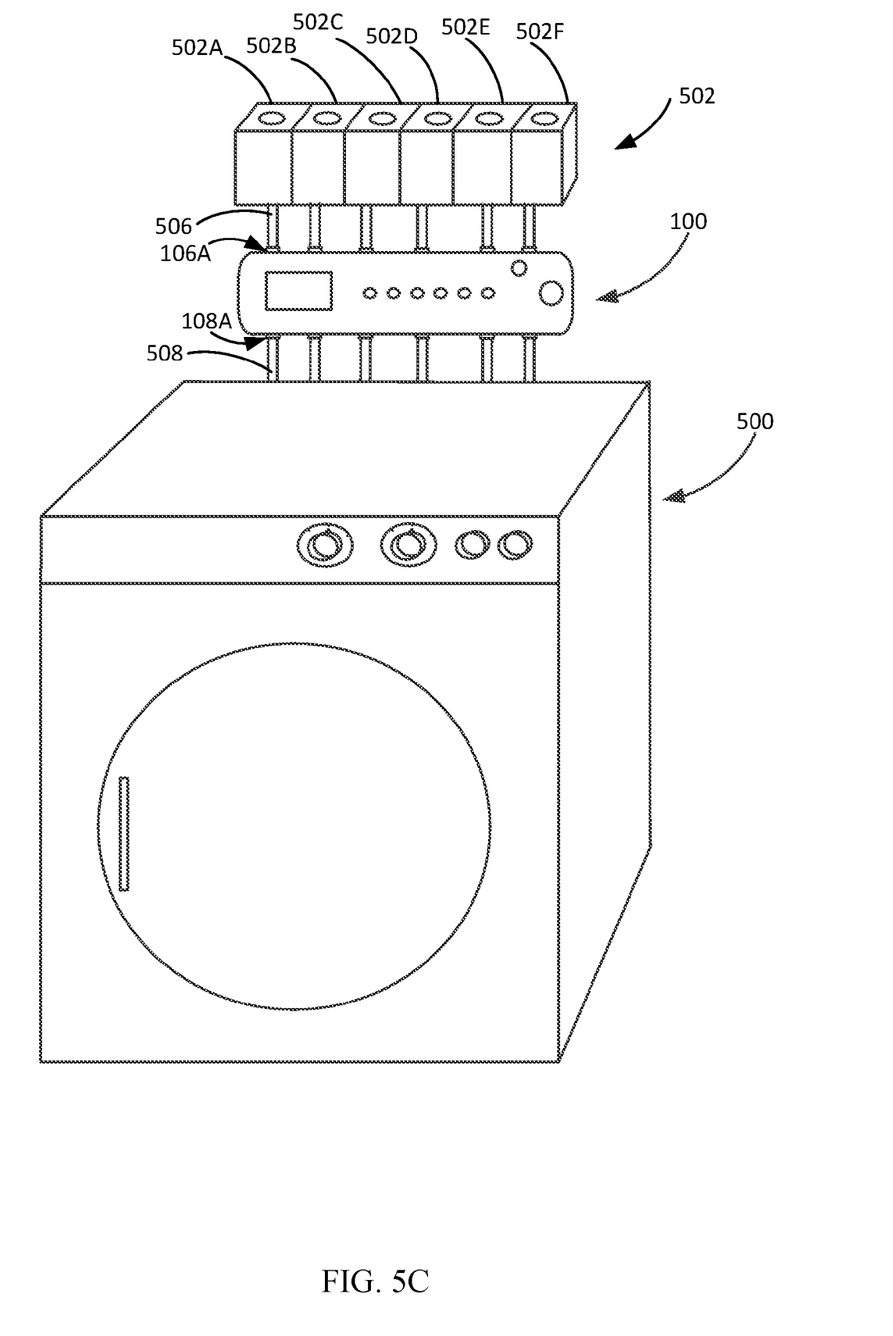
FIG. 5C schematically shows the monitoring system of FIG. 1 being fluidly coupled to the sanitation agent supply vessel of FIG. 5A.

In an embodiment, one or more channels 404 of the system 100 may be fluidly coupled to the sanitation agent supply vessel 502 of the laundry machine 500. Specifically, as shown in FIG. 5B, a portion of each supply tube 504A-504F (FIG. 5A) may first be cut out such that each supply tube 504A-504F has a proximal portion 506 proximate the supply vessel 502 and a distal portion 508 further away from the supply vessel 502. Then, as shown in FIG. 5C, the proximal portion 506 of each supply tube 504A-504F may be coupled (e.g., via a coupler) to one of the input connectors 106A-106F and the distal portion 508 of each supply tube 504A-504F may be coupled to one of the output connectors 108A-108F. During a wash cycle, the sanitation agent from each supply vessel section 502A-502F may thus flow from the tube proximal portion 506 through a channel 404A-404F and out the tube distal portion 508 into the laundry machine 500. For example, the sanitation agent in supply vessel section 502A may sequentially flow through: the proximal portion 506 of the supply tube 504A, the input connector 106A, the glass tube 402A in the case 102, the output port 108A, and then through the distal portion 508 of the supply tube 504A into the laundry machine 500 to interact with fabrics being laundered. It will be appreciated that this arrangement may not alter or impede in any significant way the workings of the laundry machine 500. If desired, fittings or seals may be used to ensure that the tube proximal portions 506 and distal portions 508 form a leak-proof pathway with the respective glass tube (e.g., tube 402A) without substantially impeding the flow of the sanitation agent to the laundry machine 500.

Figure 6:
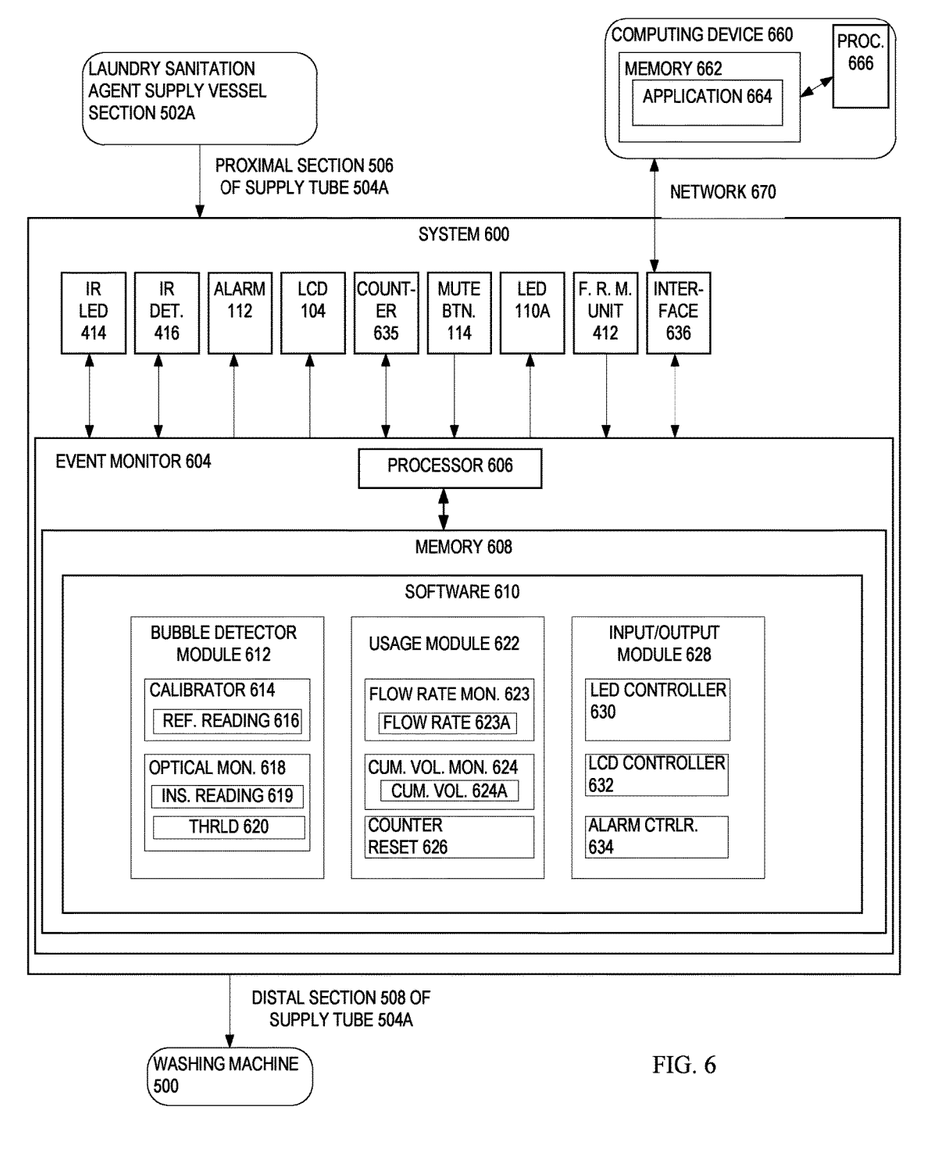
FIG. 6 schematically shows a system for monitoring a sanitation agent in a laundry system, which is an example of the monitoring system of FIG. 1.

Attention is directed now to FIG. 6, which shows a system 600 for monitoring sanitation agents in the laundry machine 500. System 600 is an example of system 100, and is illustratively shown monitoring the sanitation agent in the sanitation agent supply vessel section 502A (i.e., the sanitation agent entering the laundry machine 500 via the supply tube 504A and channel 404A). The artisan will understand that the system 600 may likewise monitor the sanitation agents flowing through the remaining channels 404B-404F in parallel.

The monitoring system 600 may include an event monitor 604. Event monitor 604 is a type of computer. In embodiments, event monitor 604 includes a processor 606 and a memory 608, which are communicatively coupled. Memory 608 may be transitory and/or non-transitory and may represent one or both of volatile memory (e.g., SRAM, DRAM, computational RAM, other volatile memory, or any combination thereof) and non-volatile memory (e.g., FLASH, ROM, magnetic media, optical media, other non-volatile memory, or any combination thereof). The processor 606 represents one or more digital processors. The processor 606 may be a microprocessor, and in embodiments, part or all of memory 608 may be integrated into processor 606. In some embodiments, the processor 606 may be configured through particularly configured hardware, such as an application specific integrated circuit (ASIC), field-programmable gate array (FPGA), etc., and/or through execution of software to perform functions in accordance with the disclosure herein.

In embodiments, the processor 606 and/or the memory 608 may be provided on the printed circuit board 408 housed in the case 102.

The event monitor 604, in the memory 608, may include software 610. The software 610 may be stored in a transitory or non-transitory portion of the memory 608. In an embodiment, the software 610 includes a bubble detector module 612, a usage module 622, and an input/output module 628. Each of the bubble detector module 612, the usage module 622, and the input/output module 628 may include or have associated therewith machine readable instructions to allow the event monitor 604 to function as described herein.

In an embodiment, the event monitor 604 may interact with (e.g., send information to and/or receive information from) the infrared LED 414, the infrared detector 416, the alarm (or beeper) 412, the LCD 104, the mute button 114, the LED 110 (i.e., the LED 110A associated with channel 404A in this example), and the flow rate measurement unit 412.

The bubble detector module 612 may include a calibrator and an optical monitor 618; the usage module 622 may include a flow rate monitor 623, a cumulative volume (i.e., flow) monitor 624, and a counter reset module 626; and, the input/output module 628 may include an LED controller 630, an LCD controller 632, and an alarm controller 634. Each of the bubble detector module 612, the usage module 622, and the input/output module 628 are described in more detail below.

The bubble detector 612 may be configured to detect the presence of a bubble in the channel 404A, and specifically, in the glass tube 402A thereof. The presence of bubbles in the tube 402A may indicate that the sanitation agent in the supply vessel section 502A has depleted. If a bubble is detected, the alarm 112 may generate an audible alarm notification and/or the LED 110A may generate a visual warning notification to apprise a user that the sanitation agent in the supply vessel section 502A needs to be replenished.

In an embodiment, the operator of the laundry machine 500 may be able to utilize the calibrator 614 to identify the normative flow of the sanitation agent in the channel 404A. The artisan will understand that the normative flow of the sanitation agent in each channel 404A-404F may (but need not) be different.

In more detail, the operator may calibrate the flow of sanitation agent in the channel 404A when the sanitation agent is flowing through the supply vessel section 502A through the system 600 to the laundry machine 500 under normal conditions (e.g., when the supply vessel section 502A is full of sanitation agent). During the calibration process, the calibrator 614 may initially cause the infrared LED 414 to emit infrared energy towards the clear glass tube 402A, and cause the infrared detector 416 to detect the infrared energy reflected off the sanitation agent in the glass tube 402A. Such may identify a baseline, i.e., a reference reading 616 for detected light (e.g., a voltage obtained from the infrared photodetector 416), during normal operation of the laundry machine 500 (e.g., when the supply vessel section 502A is full).

Once the calibration is complete, the optical monitor 618 may periodically (e.g., every millisecond, every second, every 10 seconds, etc.) monitor the sanitation agent flowing through the glass tube 402A by checking for the formation of bubble(s) therein. Specifically, the optical monitor 618 may cause the infrared LED 414 to emit infrared energy towards the glass tube 402A and cause the infrared detector 416 to detect the energy reflected off the contents of the glass tube 402A. The voltage obtained from the infrared detector 416 may be stored in the memory 608 as the instantaneous (or current) reading 619. The optical monitor 618 may thereafter compare the instantaneous reading 619 to the reference reading 616. If the sanitation agent in the supply vessel section 502A has not depleted (i.e., where sanitation agent continues to flow through the glass tube 402A to the laundry 500), the instantaneous reading 619 may be generally equal to the reference reading 616; specifically, the difference between the instantaneous reading 619 and the reference reading 616 may be less than a predefined threshold 620. If, however, the difference between the instantaneous reading 619 and the reference reading 620 is greater than the threshold 620, the optical monitor 618 may determine that a bubble has formed within the glass tube 402A. Formation of a bubble within the glass tube 402A may indicate that the sanitation agent in the supply vessel section 502A has depleted. In some embodiments, the optical monitor 618 may determine that the sanitation agent in the supply vessel section 502A has depleted only if the difference between each of two or more successive instantaneous readings 619 and the reference reading 616 is greater than the predefined threshold 620.

If the optical monitor 618 determines that the sanitation agent in the supply vessel section 502A has depleted (herein, an "alarm condition"), the bubble detector module 612 may call the input/output module 628 to apprise the operator of same. The operator may, in response, replenish the sanitation agent supply vessel section 502A to ensure that the laundry machine 500 continues to operate as intended.

The input/output module 628 may apprise the user of the alarm condition in one or more of any number of ways. For example, in embodiments, the input/output module 628 may employ the LCD controller 632 to display a warning signal on the LCD 104. For example, the LCD 104, in this example, may display the message: "refill required--line 1", or another similar message. Alternately or additionally, the input/output module 628 may employ the LED controller 630 to cause the LED 110A associated with the channel 404A to turn on, change color, blink, etc., to apprise the operator of the alarm condition. In some embodiments, each LED 110A-110F may be powered during normal operation and blink or change colors to indicate that the sanitation agent associated with a particular channel 404A-404F has depleted.

In some embodiments, the input/output module 628 may additionally or alternately use the alarm controller 634 to cause the alarm 112 to generate an audible warning to apprise the operator of the alarm condition. The audible warning may be a beep, a siren, or a different audible warning, and may, in embodiments, increase in volume over time. In embodiments, the operator may depress the mute button 114 to silence the alarm 112. In an embodiment, depressing the mute button 114 may silence the alarm 112 for a time period (e.g., for five minutes or a different length of time) to afford the operator the opportunity to replenish the sanitation agent supply vessel section 502A; in these embodiments, after the time period elapses, the alarm controller 634 may cause the alarm 112 to regenerate the audible warning.

In this way, thus, the system 100 may ensure that the laundry machine 500 continues to have the required amount of sanitation agent in the supply vessel section 502A, and that when the sanitation agent therein depletes, it is promptly replenished. While the workings of the system 600 have been described with respect to the first channel 404A, the artisan will appreciate that the bubble detector 612 may likewise monitor the sanitation agent in each of the sanitation agent supply vessel sections 502B-502F in parallel. For example, if the sanitation agent in the supply vessel section 502C depletes, the LED controller 630 may cause the LED 110C associated with the third channel 404C to blink (or light up, change colors, etc.), the LCD 104 may display the message: "refill required—channel 3" or another similar message, and so on.

The usage module 622 may monitor the usage of the sanitation agent flowing through each of the channels 404A-404F. The operation of the usage module 622 is described below with respect to the first channel 404A; the artisan, however, will understand that the usage module 622 may likewise monitor the sanitation agent flowing through each of the channels 404A-404F.

The flow rate measurement unit 412 (e.g., a positive displacement sensor) associated with channel 404A may measure the flow rate 623A (e.g., in mL/min or a different flow rate unit) of sanitation agent flowing through the glass tube 402A. The flow rate monitor 623 of the usage module 622 may obtain the flow rate 623A, and in some embodiments, cause same to be displayed on the LCD 104. The artisan will appreciate that the flow rate of sanitation agent in each channel 404A-404F may be different.

The cumulative flow monitor 624 may use the data from the flow rate monitor 623 to calculate a total volume 624A of sanitation agent that has passed through the channel 404A. In some embodiments, the system 600 may include a counter 635 (e.g., a mechanical counter, a display, or other hardware) which shows the total volume of sanitation agent that has passed through the channel 404A. The operator may use the cumulative volume 624A of sanitation agent determined by the system 600 for analytics (e.g., for estimation of costs of the sanitation agent, to aid in the selection of a more appropriate sanitation agent, to determine that the supply tube 504A is past its useful life and should be replaced, etc.). The cumulative volume 624A may alternately or additionally be displayed on the LCD 104 (e.g., in liters or another appropriate unit of measurement).

In some embodiments, the operator may be able to use the counter reset module 626 to reset the counter 635 after a given time period. For example, the operator may be able to use the counter reset module 626 to reset the counter 635 every day, every week, every month, etc. Such may enable the operator to glean the volume data with additional granularity. In embodiments, the counter reset module 626 may reset the counter 635 once the cumulative volume 624A exceeds a predefined maximum volume (e.g., 50,000 liters or a different volume). In this way, thus, the system 600 may allow an operator proximate the laundry machine 500 to monitor the flow rate and volume of sanitation agents dispensed in the machine 500, and further facilitate timely replenishment of sanitation agents in each of the sections 502A-502F by said operator.

The system 600 may further enable a user (e.g., an owner of the laundry machine 500) remote from the laundry machine 500 to monitor the sanitation agents in the supply vessel 502. Specifically, the system 600 may include an interface 636. Interface 636 is, for example, a network interface that allows the event monitor 604 to communicate over a wired communication channel, a wireless communication channel, or a combination thereof, with a computing device 660. The computing device 660 may, in embodiments, be remote from the laundry machine 500 and the system 600, and the system 600, in a preferred embodiment, may communicate with the computing device 660 over a wireless network (e.g., a Wi-Fi or other wireless network) 670. The computing device 660 may be a server, a desktop computer, a laptop computer, a smart phone, or other computing device situated at a central location, for example, and which is usable to remotely monitor many laundry monitoring systems (e.g., systems 100 and 600) coupled to laundry machines nationwide. In some embodiments, the system 600 may communicate with the computing device 660 indirectly (e.g., the system 600 may communicate with a web server which is accessible via the computing device 660).

The computing device 660 may include a processor 666 communicatively coupled to memory 662. The memory 662 may house an application 664 to allow the user to monitor the sanitation agents being used by the laundry machine 500. In some embodiments, the application 664 may be a software program that is downloaded onto the memory 662 and installed thereon to allow for communication with the system 600. In some embodiments, the application 664 may be a web portal, a dedicated, password protected, and/or other website. The system 600 may, in embodiments, include a unique identifier (e.g., an alpha-numeric or other key) that allows the application 664 to bring up the sanitation agent data associated with that particular system 600. In some embodiments, when a user (e.g., an owner of various laundry machines 500 nationwide) accesses the application 664, data from all systems 600 coupled to laundry machines 500 associated with the user may simultaneously be displayed on a display associated with the computing device 660.

Figure 7:
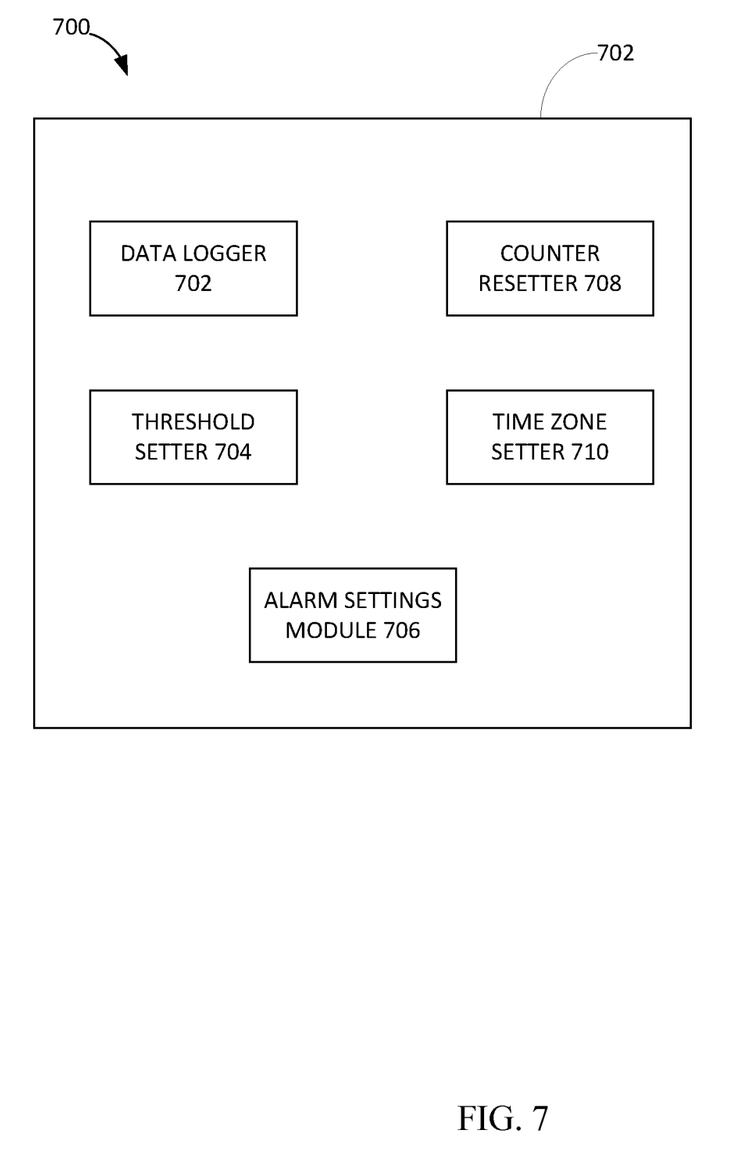
FIG. 7 shows an interface of an application associated with the system of FIG. 6.

FIG. 7 shows a home page of an example interface 700 of the application 664 being displayed on a webpage accessed using the computing device 660. The artisan will understand that the interface 700 is exemplary only and is not intended to be independently limiting.

In an embodiment, the web interface may include a data logger 702, a threshold setter 704, an alarm settings module 706, a counter resetter 708, and a time zone setter 710, each of which may be accessed by the user via an input/output device (e.g., a touch screen, a keyboard, a mouse, etc.) of the computing device 660.

The data logger 702 may log data obtained by or using the system 600 (e.g., date and time of an alarm event, the channel with which an alarm condition is associated, the flow rate and volume of sanitation agents per channel during a given time period, etc.). A user may be able to access the data logger 702 to obtain data associated with any system 600 owned (or operated) by the user from a location remote from the location of the laundry machine 500.

The threshold setter 704 may allow a remote user to set the threshold 620 (FIG. 6) for one or more channels 404A-404F. For example, the user may increase (or in some embodiments, decrease) the threshold 620 where the system 600 is generating false alarms.

Similarly, a user may revise the threshold 620 if the sanitation agent in a supply vessel section 502A is changed (e.g., if a different type or brand of sanitation agent is going to be used).

The alarm settings module 706 may allow a user to toggle or otherwise change the settings of the audible alarm 112. For example, the user may use the alarm settings module 706 to disable audible alarm 112, in which case, an indication of an alarm condition may be generated only by the LCD 104 and/or the LEDs 110A-110F. Similarly, the user may use the alarm settings module 706 to increase or decrease the volume of the audible alarm 112, change the audible notification (e.g., change the audible notification from a beep to a tone), its duration, etc.

The counter resetter 708 may allow a user to use the interface 700 to reset the cumulative volume counter 635. In some embodiments, the user may also be able to use the counter resetter 708 to change the time period and/or total volume after which the counter 635 automatically resets.

The time zone setter 710 may allow the user to set a time zone for a particular system 600. For example, if one system 600 is coupled to a laundry machine in California and another system 600 is coupled to another laundry machine in New York, the user may use the time zone setter 710 to identify the time zone for each. As such, when the user uses the data logger 702 to, for e.g., review the alerts associated with a particular system 600, the local time at which each alert was generated may also be displayed.

In this way, hence, a laundry system operator proximate the laundry machine 500 and a laundry system owner (or other person) remote from the laundry machine 500 may each use the systems 100 and 600 to ensure that the laundry machine 500 is operating properly, without having to visually inspect the laundry machine. Of course, when the system 600 indicates that a sanitation agent is low, the operator may replenish same to ensure that the laundry system 500 works as intended. Similarly, when the system 600 indicates that the flow rate of a sanitation agent is low, but the supply of the sanitation agent in the supply vessel 502 has not depleted, the operator may glean that the laundry system 500 is in need of repair (because, for e.g., a supply tube of the vessel 502 is congested).

Figure 8:
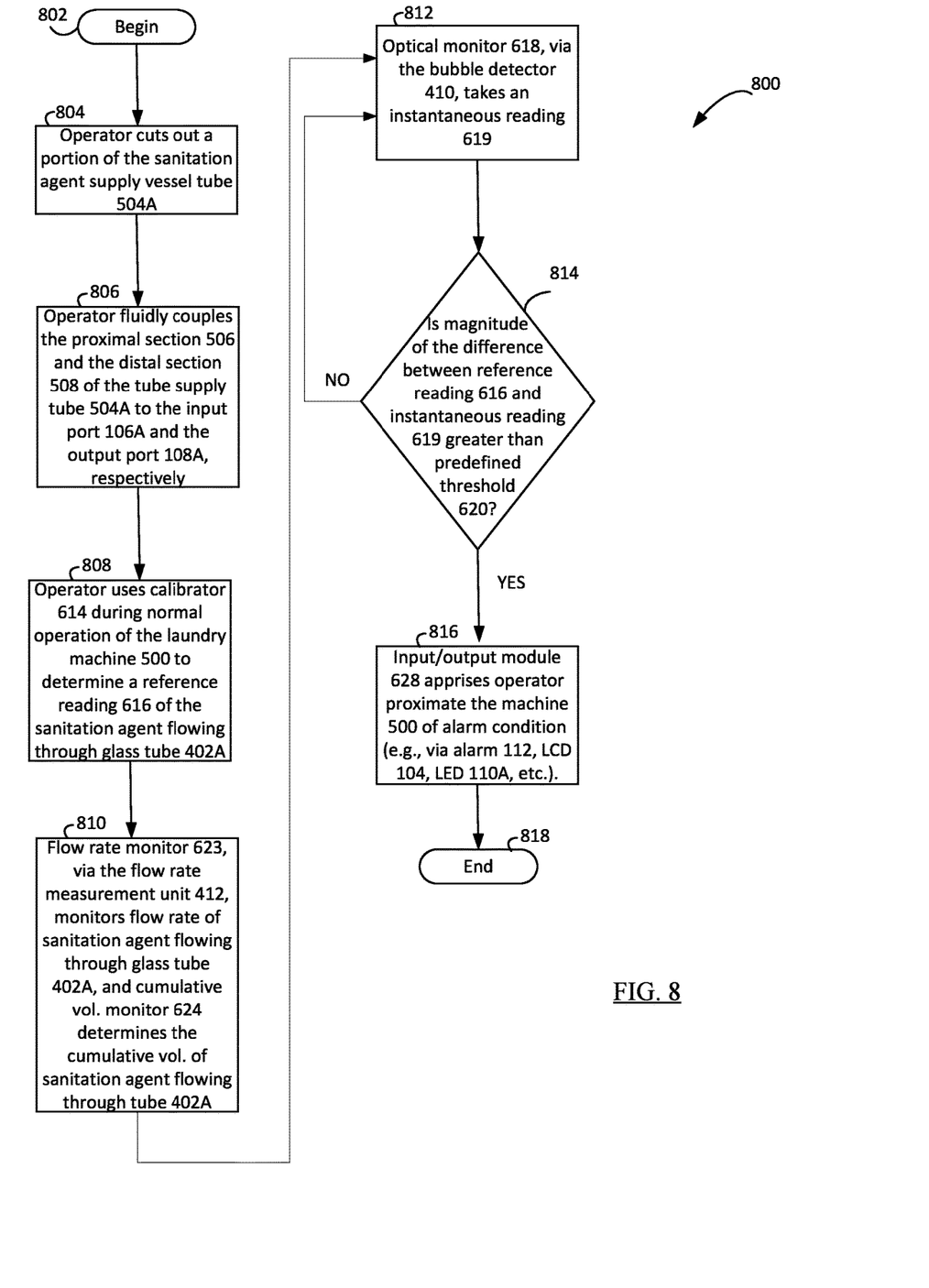
FIG. 8 shows a flowchart illustrating a method of using the monitoring system of FIG. 6, in an embodiment.

FIG. 8 shows a method 800 for an operator proximate the machine 500 to use the system 600, in an embodiment. While FIG. 8 illustrates the use of system 600 with respect to the first channel 404A, the artisan will understand that the method 800 may likewise be used monitor the sanitation agent in other channels 404B-404F.

The method 800 may begin at step 802, and at step 804, the operator may cut out a portion of the sanitation agent supply vessel tube 504A so that the system 600 may be fluidly coupled thereto. At step 806, the operator may fluidly couple the proximal section 506 of the supply tube 504A to the input port 106A and couple the distal section 508 of the supply tube 504A to the corresponding output port 108A.

At step 808, the operator may use the calibrator 614 during normal operation of the laundry machine 500 (e.g., when the supply vessel section 502A is full of sanitation agent) to determine a reference reading 616 for the sanitation agent flowing through the glass tube 402A. At step 810, the flow rate monitor 623 may, via the flow rate measurement unit 412 (e.g., a positive displacement sensor), determine the flow rate 623A of the sanitation agent flowing through the glass tube 402A and the cumulative volume monitor 624A may determine the cumulative volume 624A of the sanitation agent flowing through the glass tube 402A.

At steps 812-814, the optical monitor 618, via the bubble detector 410 (e.g., the infrared LED 414 and infrared detector 416), may check for the presence of bubbles in the glass tube 402A. Specifically, at step 812, the optical monitor 618, via the infrared LED 414 and infrared detector 416, may take an instantaneous reading 616 of the infrared red energy reflected off the contents of the glass tube 402A. At step 814, the optical monitor 618 may compare the instantaneous reading 619 to the reference reading 616.

If, at step 814, the magnitude of the difference between the reference reading 616 and instantaneous reading 619 is less than the predefined threshold 620 (which may indicate that an appropriate volume of sanitation agent is flowing from the supply vessel section 502A through the glass tube 402A into the laundry machine 500), the method 900 may loop back to step 812, take another instantaneous reading 619, and compare the next instantaneous reading with the reference reading 616. If, on the other hand, the magnitude of the difference between the reference reading 616 and instantaneous reading 619 at step 814 is greater than the predefined threshold 620 (which may indicate the presence of bubble(s) in the tube 402A and thereby signify that the sanitation agent in the supply vessel section 502A has depleted), the input/output module 628 may apprise the operator proximate the machine 500 of the alarm condition at step 816. For example, the LED controller 630, the LCD controller 632, and/or the alarm controller 634 may communicate an indication of the alarm condition via the LED 110A, the LCD 104, and/or the alarm 112, respectively.

Figure 9:
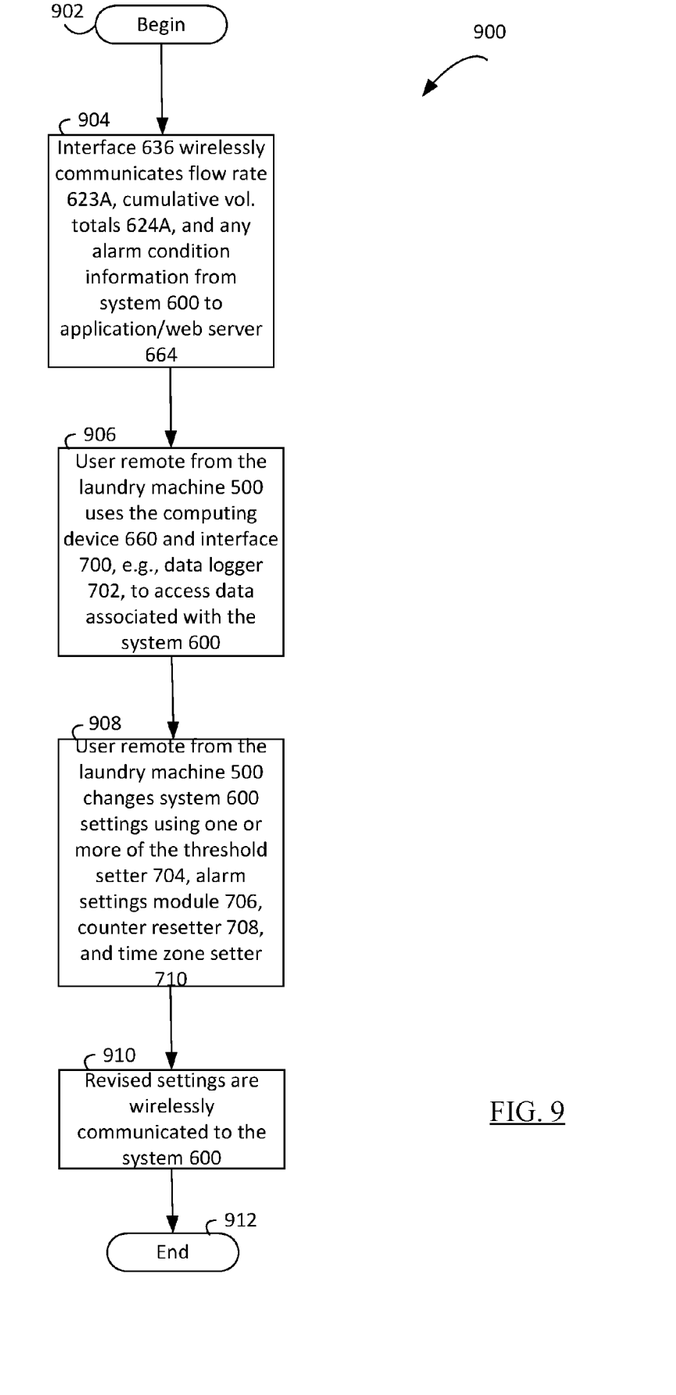
FIG. 9 shows a flowchart illustrating another method of using the monitoring system of FIG. 6, in an embodiment.

FIG. 9 shows a method 900 for a user remote from the machine 500 to use the system 600, in an embodiment. The method 900 may begin at step 902. At step 904, once the system 600 and the laundry machine are powered on, the interface 636 may wirelessly communicate the flow rate 623A, the cumulative flow totals 624A, and alarm condition information from the system 600 to the application/web server 664. At step 906, the user may use the computing device 660 and interface 700 (e.g., the data logger 702 of the application 664) to access the data associated with the system 600. At step 908, if desired, the user may change the settings of the system 600 using one or more of the threshold setter 704, alarm settings module 706, counter resetter 708, and time zone setter 710. At step 910, any settings changed by the user at step 908 may be wirelessly communicated to the system 600 by the computing device 660. The method 900 may then end at step 912.

As discussed above, in some embodiments, the bubble detector module 612 may determine that the flow of sanitation agent in a channel (e.g., channel 404A or a different channel) is impaired by determining whether a difference between the instantaneous reading 619 and the reference reading 616 is greater than the threshold 620 associated with that that channel. In other embodiments, each channel may have the same threshold associated therewith, and the bubble detector 612, e.g., the optical monitor 618 thereof, may instead determine an alarm condition by comparing a variance in successive instantaneous reading 619 obtained by the detector 416 to the threshold. In more detail, during normal conditions, when an appreciable amount sanitation agent is flowing through the glass tubes (e.g., tube 402A), the instantaneous reading 619 may be generally stable (e.g., have little or no variance); however, when the flow of sanitation agent in a glass tube (e.g., tube 402A) is impaired, a plurality of bubbles may form in the glass tube, and the bubbles may cause the successive instantaneous reading 619 to vary (e.g., cause the output of the infrared detector 416 to have spikes). As such, in some embodiments, the optical monitor 618 may determine an alarm condition when the total variance in successive instantaneous reading 619 taken over a time period (e.g., in one millisecond, one second, etc.) is above a threshold. Such may obviate the need to set a different threshold for each channel and may allow the bubble detector module 612 to properly determine an alarm condition across all the channels notwithstanding the different opacities, colors, and tints, of the sanitation agents flowing through the various channels.

The artisan understands that the temperature of water being used by the laundry machine 500 in the laundry cycles may be set by the operator. For example, the operator may use an input device of the laundry machine 500 to cause the laundry machine 500 to use warm water, hot water, cold water, etc., during the wash cycle. If the laundry machine 500 does not wash the fabrics with water at the desired temperature (e.g., uses cold water to wash the clothes even where the operator has indicated that the clothes are to be washed using hot water), the fabrics may not be suitably cleaned and/or may be damaged. In some embodiments, a temperature sensor may be associated with a drain tube of the laundry machine 500 and may communicate the temperature of the drained fluids (e.g., water and sanitation agents) to the system 600 in a wired or wireless way. Data from the temperature sensors, where employed, may also be wirelessly communicated from the system 600 to the web server 664 so that a log of this data is maintained and is accessible to the user remote from the machine 500.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps listed in the various figures need be carried out in the specific order described.

The disclosure claimed is:

1. A system for monitoring sanitation agents in a laundry machine, comprising:
    a plurality of channels, each channel having a cylindrical input port, a cylindrical output port, and a glass tube; each said input port and said output port adapted to be fluidly coupled to a sanitation agent supply vessel of said laundry machine;
    a monitoring unit associated with each said glass tube, each said monitoring unit including a bubble detector and a flow rate measurement unit arranged in line with said bubble detector; said bubble detector including an infrared LED and an infrared detector; said flow rate measurement unit including a positive displacement sensor;
    a plurality of visible indicators, each one of said visible indicators associated with one of said plurality of channels;
    a memory storing computer-readable instructions and a plurality of thresholds, each one of said thresholds being associated with one of said plurality of channels; and
    a controller communicatively coupled to each said monitoring unit and being configured to execute said instructions to:
        determine an alarm condition;
        cause at least one of said plurality of visible indicators to identify the channel with which said alarm condition is associated; and
        wirelessly communicate to a web page a volume of a sanitation agent that has passed through each of said glass tubes.

2. The system of claim 1, wherein said glass tubes and said monitoring units are housed within a case.

3. The system of claim 2, wherein said plurality of channels includes six channels.

4. The system of claim 3, further comprising a liquid crystal display.

5. The system of claim 4, further comprising a beeper configured to generate an audible notification in response to said determination of said alarm condition.

6. The system of claim 5, wherein said liquid crystal display and each of said visible indicators is disposed on a top side of said case.

7. The system of claim 6, further comprising a mute button usable to silence said audible notification.

8. The system of claim 6, further comprising a mute button usable to silence said audible notification for a predefined time period.

9. The system of claim 1, wherein said instructions are further configured to communicate to said web page information about the determination of said alarm condition.

10. The system of claim 1, wherein said information includes a time at which said alarm condition was determined.

11. A system for monitoring sanitation agents in a laundry machine, comprising:
    a case having a top side, an input side, and an output side opposing said input side; said input side having a plurality of input ports and said output side having a plurality of output ports;
    a plurality of glass tubes, each of said plurality of glass tubes fluidly coupling one of said plurality of input ports to one of said plurality of output ports;
    a plurality of monitoring units, each of said plurality of monitoring units associated with one of said plurality of glass tubes; each of said plurality of monitoring units comprising a bubble detector and a flow rate measurement unit arranged in line with said bubble detector; said bubble detector including an infrared LED and an infrared detector; said flow rate measurement unit including a positive displacement sensor;
    a liquid crystal display arranged on said top side;
    a memory storing computer-readable instructions;
    a controller configured to execute said instructions to determine an alarm condition; and
    a visible indicator configured to identify one of said plurality of glass tubes with which said alarm condition is associated.

12. The system of claim 11, further comprising a beeper; said beeper being activated upon said determination of said alarm condition.

13. The system of claim 11, further comprising a networking interface configured to communicate an indication of said alarm condition to a computing device.

14. The system of claim 13, wherein said computing device is a mobile computer.

15. The system of claim 13, wherein said controller is housed on a printed circuit board within said case.

16. A system for monitoring sanitation agents in a laundry machine, comprising:
    a plurality of channels, each channel having an input port, an output port, and a glass tube; each said input port and said output port adapted to be fluidly coupled to said laundry machine;
    a monitoring unit associated with each said glass tube, each monitoring unit including a bubble detector and a flow rate measurement unit;
    a beeper configured to generate an indication of an alarm condition based on a determination made by any one of said monitoring units;
    a display screen;
    a memory storing computer-readable instructions; and
    a controller communicatively coupled to each said monitoring unit and being configured to execute said instructions to wirelessly communicate to a web page a volume of a sanitation agent that has passed through each of said glass tubes.

17. The system of claim 16, further comprising a plastic case housing each of said glass tubes.

18. The system of claim 17, further comprising a mute button; said mute button being useable to silence said beeper for a time period.

19. The system of claim 16, further comprising one visible indicator associated with each of said plurality of channels.

20. The system of claim 16, wherein said flow rate measurement unit includes a positive displacement sensor.

* * * * *